US011340107B2

(12) United States Patent
Hansen

(10) Patent No.: US 11,340,107 B2
(45) Date of Patent: May 24, 2022

(54) METHODS AND APPARATUS FOR FEEDING, WEIGHING, AND COLLECTING SOLID FOOD PRODUCTS WITH STICKY COATINGS

(71) Applicant: CABINPLANT INTERNATIONAL A/S, Haarby (DK)

(72) Inventor: Henning Ingemann Hansen, Odense (DK)

(73) Assignee: CABINPLANT INTERNATIONAL A/S, Harby (DK)

( * ) Notice: Subject to any disclaimer, the term of this patent is extended or adjusted under 35 U.S.C. 154(b) by 117 days.

(21) Appl. No.: 16/609,933

(22) PCT Filed: Apr. 26, 2018

(86) PCT No.: PCT/EP2018/060801
§ 371 (c)(1),
(2) Date: Oct. 31, 2019

(87) PCT Pub. No.: WO2018/202555
PCT Pub. Date: Nov. 8, 2018

(65) Prior Publication Data
US 2020/0116549 A1 Apr. 16, 2020

(30) Foreign Application Priority Data
May 2, 2017 (EP) ..................................... 17169086

(51) Int. Cl.
*G01G 19/393* (2006.01)
*G01G 13/24* (2006.01)

(52) U.S. Cl.
CPC ......... *G01G 19/393* (2013.01); *G01G 13/242* (2013.01)

(58) Field of Classification Search
CPC ..... G01G 13/22; G01G 13/242; G01G 19/393
See application file for complete search history.

(56) References Cited

U.S. PATENT DOCUMENTS

| 4,569,434 A | 2/1986 | Horii et al. |
| 4,662,508 A * | 5/1987 | Inoue .................. G01G 19/393 177/25.18 |

(Continued)

FOREIGN PATENT DOCUMENTS

| EP | 0909601 | 4/1999 |
| EP | 1074822 | 2/2001 |

(Continued)

OTHER PUBLICATIONS

Computer translation of JP 05-107104 downloaded from the JPO webpage Apr. 22, 2021.*

(Continued)

*Primary Examiner* — Randy W Gibson
(74) *Attorney, Agent, or Firm* — Klein, O'Neill & Singh, LLP

(57) ABSTRACT

A multihead weigher with a collector for feeding, weighing and collecting solid food products with a sticky coating. The multihead weigher has a number of receptacles for weighing the solid food products and discharging the solid food product to the collector. Each receptacle having a scraper for scraping the surface of the receptacle when the solid food product is being discharged from the receptacle into the collector.

8 Claims, 8 Drawing Sheets

(56) References Cited

U.S. PATENT DOCUMENTS

| | | | | |
|---|---|---|---|---|
| 4,848,534 | A * | 7/1989 | Sandwall | B65D 90/582 |
| | | | | 198/535 |
| 5,340,949 | A * | 8/1994 | Fujimura | G01G 19/393 |
| | | | | 177/25.18 |
| 5,526,437 | A | 6/1996 | West | |
| 5,705,776 | A * | 1/1998 | Mizobuchi | G01G 13/22 |
| | | | | 141/125 |
| 5,813,195 | A * | 9/1998 | Nielsen | B65B 1/32 |
| | | | | 53/443 |
| 6,015,049 | A | 1/2000 | Heikes | |
| 6,437,256 | B1 * | 8/2002 | Miyamoto | G01G 19/393 |
| | | | | 177/25.18 |
| 7,312,408 | B2 * | 12/2007 | Kawanishi | G01G 19/393 |
| | | | | 177/105 |
| 7,952,037 | B2 * | 5/2011 | Jacobi | B65B 1/32 |
| | | | | 177/52 |
| 8,851,269 | B2 * | 10/2014 | Hansen | B65B 57/14 |
| | | | | 198/563 |

FOREIGN PATENT DOCUMENTS

| | | | |
|---|---|---|---|
| EP | 2737802 | 6/2014 | |
| JP | 05-107104 A * | 4/1993 | G01G 13/22 |
| WO | WO1998049892 | 11/1998 | |
| WO | WO2012104404 | 8/2012 | |
| WO | WO2014067532 | 5/2014 | |
| WO | WO2015000489 | 1/2015 | |

OTHER PUBLICATIONS

International Search Report on corresponding PCT application (PCT/EP2018/060801) from International Searching Authority (EPO) dated Nov. 28, 2018.

Written Opinion on corresponding PCT application (PCT/EP2018/060801) from International Searching Authority (EPO) dated Nov. 28, 2018.

Marel; "Grading & Batching Gain more give away less ©BULLET Detailed industry knowledge ©BULLET Individual project consulting ©BULLET State-of-the-art batching equipment"; Apr. 29, 2013; XP055406557; URL: http://marel.com/files/pdf/marel_fish_grading_and_batching.pdf?ind=fish.

* cited by examiner

METHODS AND APPARATUS FOR FEEDING, WEIGHING, AND COLLECTING SOLID FOOD PRODUCTS WITH STICKY COATINGS

CROSS-REFERENCE TO RELATED APPLICATIONS

This application is the national phase entry, under 35 U.S.C. Section 371(c), of International Application No. PCT/EP2018/060801, filed Apr. 26, 2018, claiming priority from European Patent Application No. 17169086.0, filed May 2, 2017. The disclosures of the International Application and the European Application from which this application claims priority are incorporated herein by reference in their entirety.

FEDERALLY SPONSORED RESEARCH OR DEVELOPMENT

Not Applicable

BACKGROUND

The present specification relates to methods and systems for weighing and collecting solid food products with sticky coatings.

Within industries such as the foodstuff industry, weighing systems have been described in publications such as U.S. Pat. No. 6,015,049, WO9849892, U.S. Pat. Nos. 5,526,437, 4,569,434, EP0909601, and WO12104404 all of which publications are hereby incorporated in the present specification by reference.

In the foodstuff industry, there is a need for sorting products or articles at high speeds or throughputs according to various physical characteristics such as size, colour or weight, alternatively by any combination of these.

Industrially packed solid food products, such as pieces or poultry, are often packed in packages of approximately equal weight—independent of the number of pieces included in the package. Therefore, many packages of solid food products include more than one individual product, i.e. the packages normally include at least two solid food products. Some product packages, such as packages of chicken breast, typically include three pieces in each package, however, the number may be greater such as four or five pieces within the same package, as long as the packages all have approximately the same weight.

In order to ensure that food products of varying weight may be combined in packages having approximately the same weight, a multihead weigher may be used.

An example of a solid food product (as opposed to liquid) is a piece of poultry, and an example of a sticky coating is a marinade. The marinade has a tendency to stick or adhere to walls of the multihead weigher, which can introduce weighing errors, which in the end can cause packages to have a smaller weight of solid food product than advertised on a package label.

SUMMARY

It is an object to provide techniques for weighing, collecting and discharging solid food products with sticky coatings.

The above object and advantages together with numerous other objects and advantages, which will be evident from the description, are according to a first aspect obtained by:

A method of feeding and weighing a solid food product with a sticky coating, said method comprising:
providing a pool hopper, said pool hopper including
an inlet end for receiving said solid food product,
an outlet end for discharging said solid food product,
a feeder for conveying said solid food product from said inlet end to said outlet end,
introducing said solid food product into said inlet end,
conveying by means of said feeder said food products in a direction from said inlet end towards said outlet end,
providing a receptacle for weighing said solid food product, and a receptacle support for supporting said receptacle, said receptacle being located below said outlet end, said receptacle including
a first end wall and a second end wall opposite said first end wall,
a first axis extending through said first end wall and said second end wall,
a receptacle wall between said first end wall and said second end wall,
said receptacle wall having an inner surface constituting a circular cylindrical surface having its axis of rotation coinciding with said first axis,
said inner surface extending angularly around said first axis from a first edge to a second edge over a first angle, said first angle being more than 150° and less than 180°,
said receptacle further including an opening between said first edge and said second edge for receiving said solid food product when discharged from said outlet end,
said receptacle being rotatably mounted to said receptacle support for rotating around said first axis,
in a first operational mode discharging said solid food product from said outlet end into said receptacle and weighing said solid food product, said opening facing upwards in said first operational mode,
providing a scraper for scraping said inner surface,
said scraper having a scraper edge contacting said inner surface,
said scraper edge being proximate said first edge and stationary when said receptacle rotates around said first axis,
in a second operational mode rotating said receptacle such that said second edge being rotated to said scraper edge while scraping said inner surface, and said solid food product being discharged from said receptacle.

According to a second aspect of the present specification, the above objects and advantages are obtained by:

A weigher head for feeding and weighing a solid food product with a sticky coating, said weigher head comprising:
a pool hopper, said pool hopper including
an inlet end for receiving said solid food product,
an outlet end for discharging said solid food product,
a feeder for conveying said solid food product from said inlet end to said outlet end,
said weigher head comprising
a receptacle for weighing said solid food product, and a receptacle support for supporting said receptacle, said receptacle being located below said outlet end,
said receptacle including
a first end wall, and a second end wall opposite said first end wall,
a first axis extending through said first end wall and said second end wall,
a bottom wall between said first end wall and said second end wall,
said bottom wall having an inner surface constituting a circular cylindrical surface having its axis of rotation coinciding with said first axis, said inner surface extending angularly around said first axis from a first edge to a second edge over a first angle, said first angle being more than 150° and less than 180°, said receptacle further including an opening between said first edge and said second edge for receiving said solid food product when discharged from said outlet end, said receptacle being rotatably mounted to said receptacle support for rotating around said first axis, said receptacle further including a scraper for scraping said inner surface, said scraper having a scraper edge contacting said inner surface, said scraper edge being proximate said first edge and stationary when said receptacle rotates around said first axis, said weigher head further comprising an actuator for rotating said receptacle in an angular direction such that said second edge being rotated to said scraper edge, and said solid food product being discharged from said receptacle.

The first angle may be in alternative intervals such as between 160° and 180° or 170° and 180°, or 175° and 180°, or 150° and 175°, or 150° and 170° or 160° and 175°.

According to a third aspect of the present specification, the above objects and advantages are obtained by:

A method of collecting solid food products with sticky coatings received from a multihead weigher, and discharging said collected solid food products, said method comprising:

providing an annularly shaped compartment with a first opening facing upwards for receiving said solid food products, said first opening delimited by two concentric side walls extending upwards from a bottom wall, further providing a first scraper positioned in said annularly shaped compartment and movable in an angular direction within said annularly shaped compartment, a discharge compartment within said annularly shaped compartment, a piston positioned in said discharge compartment and movable in a radial direction within said discharge compartment, said discharge compartment having a discharge opening, said method further comprising in a first operational mode receiving said solid food products in said annularly shaped compartment from said multihead weigher, in a second operational mode, scraping said annularly shaped compartment by means of said first scraper in said angular direction thereby collecting said received solid food products into a first batch, and introducing said first batch into said discharge compartment, in a third operational mode scraping said discharge compartment by means of said piston in said radial direction and discharging said first batch through said discharge opening.

According to a fourth aspect of the present specification, the above objects and advantages are obtained by:

A collector for collecting solid food products with sticky coatings received from a multihead weigher, and discharging said collected solid food products, said collector comprising:

an annularly shaped compartment with a first opening facing upwards for receiving said solid food products, said first opening delimited by two concentric side walls extending upwards from a bottom wall, said collector further comprising a first scraper positioned in said annularly shaped compartment and movable in an angular direction within said annularly shaped compartment for scraping said annularly shaped compartment and collecting said received solid food products into a first batch, and introducing said first batch into said discharge compartment, a discharge compartment within said annularly shaped compartment having a discharge opening, a piston positioned in said discharge compartment and movable in a radial direction within said discharge compartment for scraping said discharge compartment and discharging said first batch through said discharge opening.

BRIEF DESCRIPTION OF THE DRAWINGS

The above aspects will now be explained in more detail below by means of examples of embodiments with reference to the drawings, in which.

DETAILED DESCRIPTION

Figure 1:
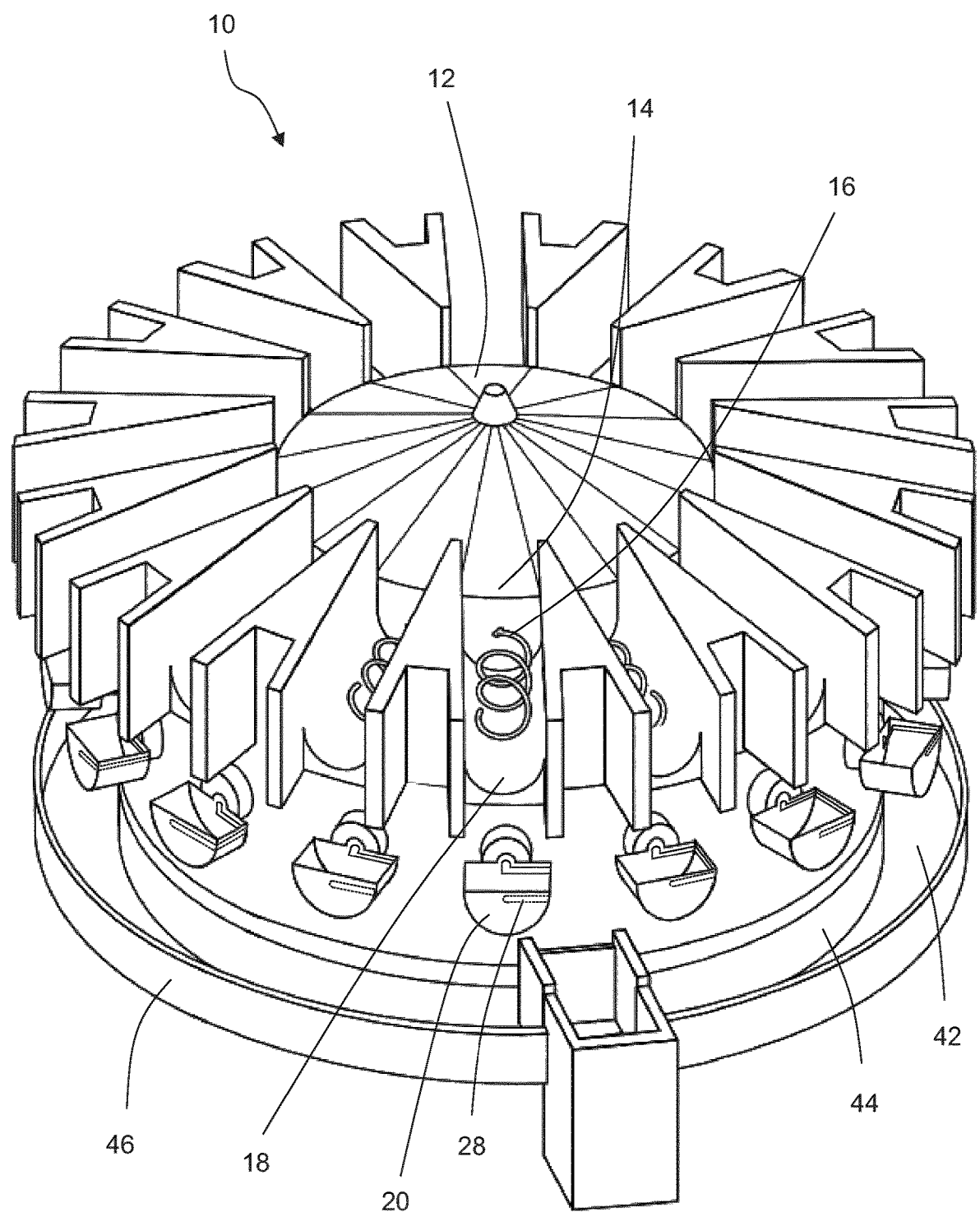
FIG. 1 shows a perspective of a multihead weigher.

The aspects may be embodied in different forms and should not be construed as limited to the embodiments set forth herein. Rather, these embodiments are provided so that this disclosure will be thorough and complete and will fully convey the scope of the specification to those skilled in the art. Like reference numerals refer to like elements throughout. Like elements will thus not be described in detail with respect to the description of each figure.

FIG. 1 shows a perspective of a multihead weigher 10.

The multihead weigher comprises a receiving section 12. The receiving section has a shape of a cone with an apex facing upwards for receiving solid food products being delivered from above the receiving section.

During operation of the multihead weigher, the solid food products are typically distributed randomly on the receiving section as they are received from above, and will due to gravity and the conical shape of the receiving section slide down towards a periphery of the receiving section at a bottom end of the receiving section.

The receiving section may optionally be rotating or vibrating in order to distribute the food products more evenly along the periphery of the receiving section and for avoiding any food products remaining for a longer time on the receiving section.

Around the periphery of the receiving section is located sixteen pool hoppers (feeder conveyors) along a ring and surrounding the receiving section up to 360° notwithstanding any abruptions such as parts of a frame system for supporting conveyor structures used in connection with the multihead weigher.

Each pool hopper comprises a feeding channel, in which a feeder 16 is located. The feeder is a screw conveyor in the form of a helically shaped hollow rod. The distance between two turns typically corresponds to the size of the solid food product to be conveyed, e.g. about 0.1 m in case of a chicken breast. The feeding channel extends from an inlet end 14 located adjacent the periphery of the receiving section to an outlet end 18 located opposite the inlet end.

Solid food products entering the receiving section will be randomly distributed among the pool hoppers.

As a solid food product enters the inlet end of one of the pool hoppers it is carried along the feeding channel by the screw conveyor towards the outlet end, and discharged to a weighing hopper constituting a receptacle 20 below the outlet end.

The multihead weigher comprises one receptacle for each pool hopper. Together a pool hopper and a receptacle constitute a weighing head. Thus, there are sixteen receptacles (up to nine receptacles can be seen in the perspective of the multihead weigher shown in FIG. 1). The receptacles are placed along a ring in a plane below the sixteen pool hoppers.

Figure 2:
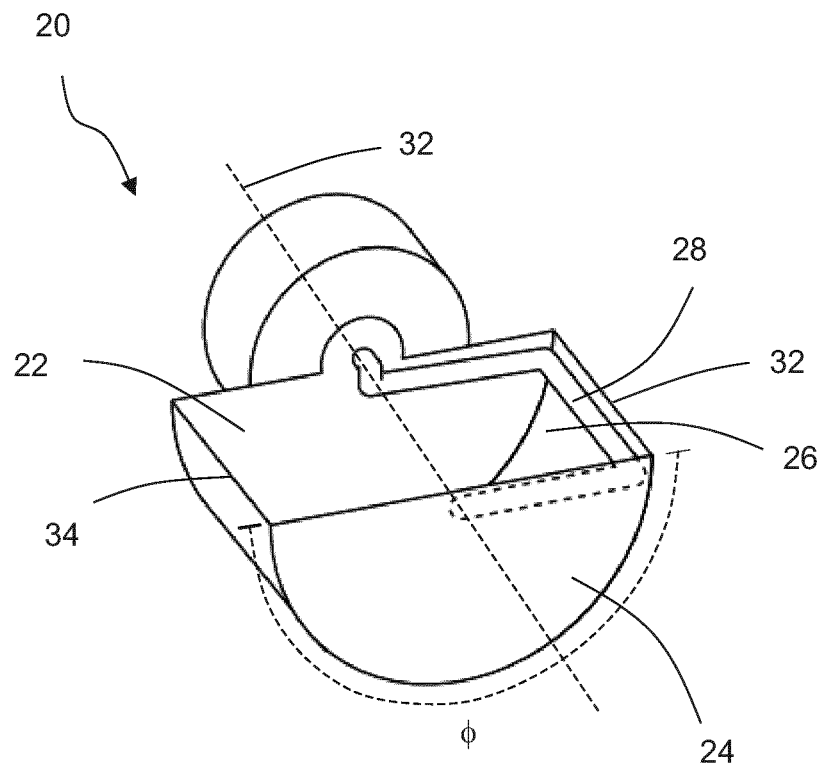
FIG. 2 shows a close-up perspective of a receptacle.

An individual receptacle is described more closely in relation to FIG. 2.

Further below the plane, in which the receptacles are located, is a collector, which may be one of the four different collectors described more closely in relation to FIGS. 4*a-e*.

FIG. 2 shows a close-up perspective of a receptacle 20.

The receptacle is supported by a receptacle support.

The receptacle has a shape similar to a hollow semi cylinder, i.e. it is defined by a first end wall 22, and a second end wall 24, which is opposite the first end wall.

A first axis 36 extends through the first end wall and the second end wall.

Between the first end wall and the second end wall is a receptacle wall 26, i.e. the receptacle wall 26 has an inner surface constituting a semi-circular cylindrical surface having its axis of rotation coinciding with the first axis.

The inner surface extends angularly around the first axis from a first edge 32 to a second edge 34 over a first angle φ, the first angle being 170° (or approximately 170° such as 179° or 178° or 177° or within 170°±9° or 170°±8° 170°±7° 170°±6° or 170°±5°. This means that the receptacle is open, i.e. a solid food product can fall down into the receptacle in a receptacle opening between the first edge and the second edge. Thus, as a solid food product is discharged from the outlet end of a pool hopper it falls down into the receptacle located below the outlet end of the respective receptacle due to gravity.

The receptacle is oriented such that the first axis is parallel or substantially parallel to a feeding channel—each feeding channel of a pool hopper having a second axis extending through the inlet end and the outlet end. Alternatively, the receptacle may be oriented such that the first axis is orthogonal to the second axis.

The receptacle is rotatably mounted to the receptacle support such that it can rotate around the first axis.

The rotation and orientation of the receptacle as well as the discharging of a solid food product from a pool hopper are controlled such that the opening faces upwards when a solid food product is discharged from a pool hopper.

As a solid food product has been discharged to a receptacle, the weight of the solid food product is determined. If a number of receptacles have solid food products, which have a combined weight suitable for being batched together and packaged in a package with a certain target weight, the respective receptacles rotate upside down so that the solid food products fall out and down into a collector, which is located below the receptacles. Different collectors are described more closely in relation to FIGS. 4*a-e*.

The multihead weigher is to operate with solid food products with sticky coatings, which may adhere to the inner surface and possibly to the first end wall and second end wall. As a receptacle is emptied, part of the sticky coating may be left in the receptacle. This may introduce an error when weighing a successive solid food product. The error may increase with the number of solid food products having been handled by the multihead weigher. To avoid this, inside the receptacle is provided a scraper for scraping the interior of the receptacle as the receptacle is emptied.

The scraper has a scraper edge, which contacts the inner surface. The scraper edge is proximate said first edge, i.e. the scraper edge is less than 10° from the first edge.

The scraper is U-shaped so that a base of the scraper scrapes the inner surface, a first leg of the scraper scrapes an inner side of the first end wall, and a second leg of the scraper scrapes an inner side of the second end wall.

The scraper is supported by a scraper support, and is stationary when the receptacle rotates around the first axis.

The receptacle is connected to an actuator, which rotates the receptacle such that the inner surface moves along the scraper until the second edge reaches the scraper edge, in which the receptacle has rotated 170° minus the angle that the scraper edge is away from the first edge (less than 10°).

As the receptacle has been emptied, it is rotated back in an opposite direction so that it is ready to receive a successive solid food product. Alternatively, the receptacle may continue the rotation and rotate all the way round so that it is ready to receive a successive solid food product.

Figure 3A:
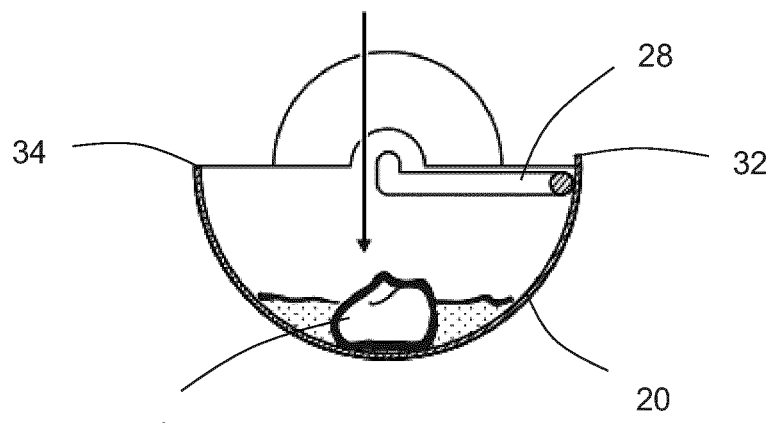
FIGS. 3a-c show perspectives of a receptacle in three different positions.
Figure 3B:
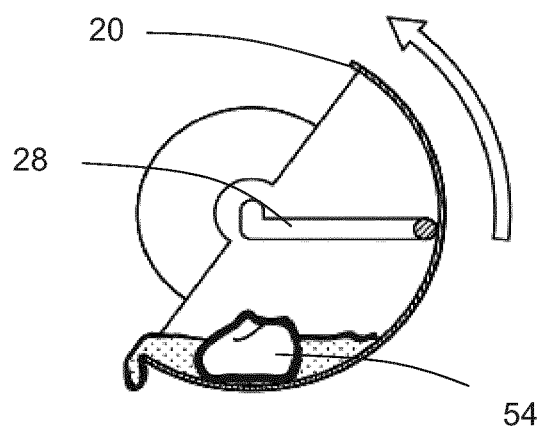
Figure 3C:
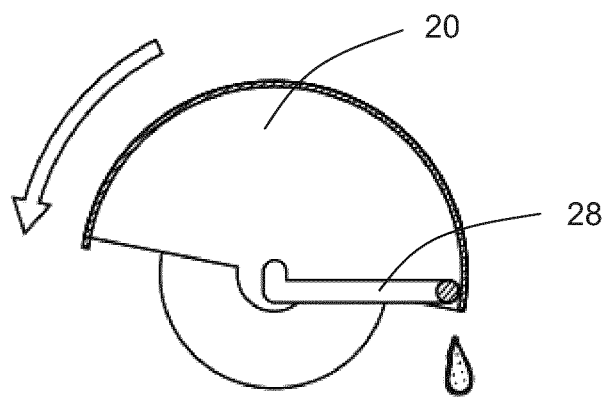

FIG. 3*a-c* show perspectives of a receptacle 20 in three different positions.

In FIG. 3*a*, the receptacle faces upwards, i.e. the receptacle opening is facing upwards and a solid food product 54 is in the receptacle. A cross-section of the receptacle with a normal parallel to the first axis will show the receptacle being convex (in a normal rectangular xy-coordinate system with the x-axis being horizontal and the y-axis being vertical). The receptacle can be said to be in a first operational mode/state constituting a receiving mode when the receptacle has the position shown in FIG. 3*a*.

In FIG. 3*b*, the receptacle has rotated approximately 30°, i.e. the second edge has been moved closer to the scraper edge compared to the position in the receiving mode, and the first edge has been moved further away from the scraper edge compared to the position in the receiving mode. The receptacle can be said to have entered into a second operational mode/state constituting a discharging mode when the receptacle has the position shown in FIG. 3*b*.

In FIG. 3*c*, the receptacle has rotated such that it more or less faces upside down, i.e. with the receptacle opening facing downwards. A cross-section of the receptacle with a normal parallel to the first axis will show the receptacle being concave. The second edge has been moved all the way to meet the scraper edge. In this way, the area of the inner surface between the line (where the scraper edge contacts the inner surface in the first operational mode) and the second edge has been scraped.

Due to a combination of gravity and the solid food product being pushed by the receptacle scraper, the solid food product will be discharged from the receptacle.

As the receptacle has been emptied, it rotates back to the position it has in the first operational mode described in connection with FIG. 3*a*.

The receptacle cycles between the first operational mode and the second operational mode as successive solid food products are being discharged from the outlet end of the feeder head above the respective receptacle.

Figure 4A:
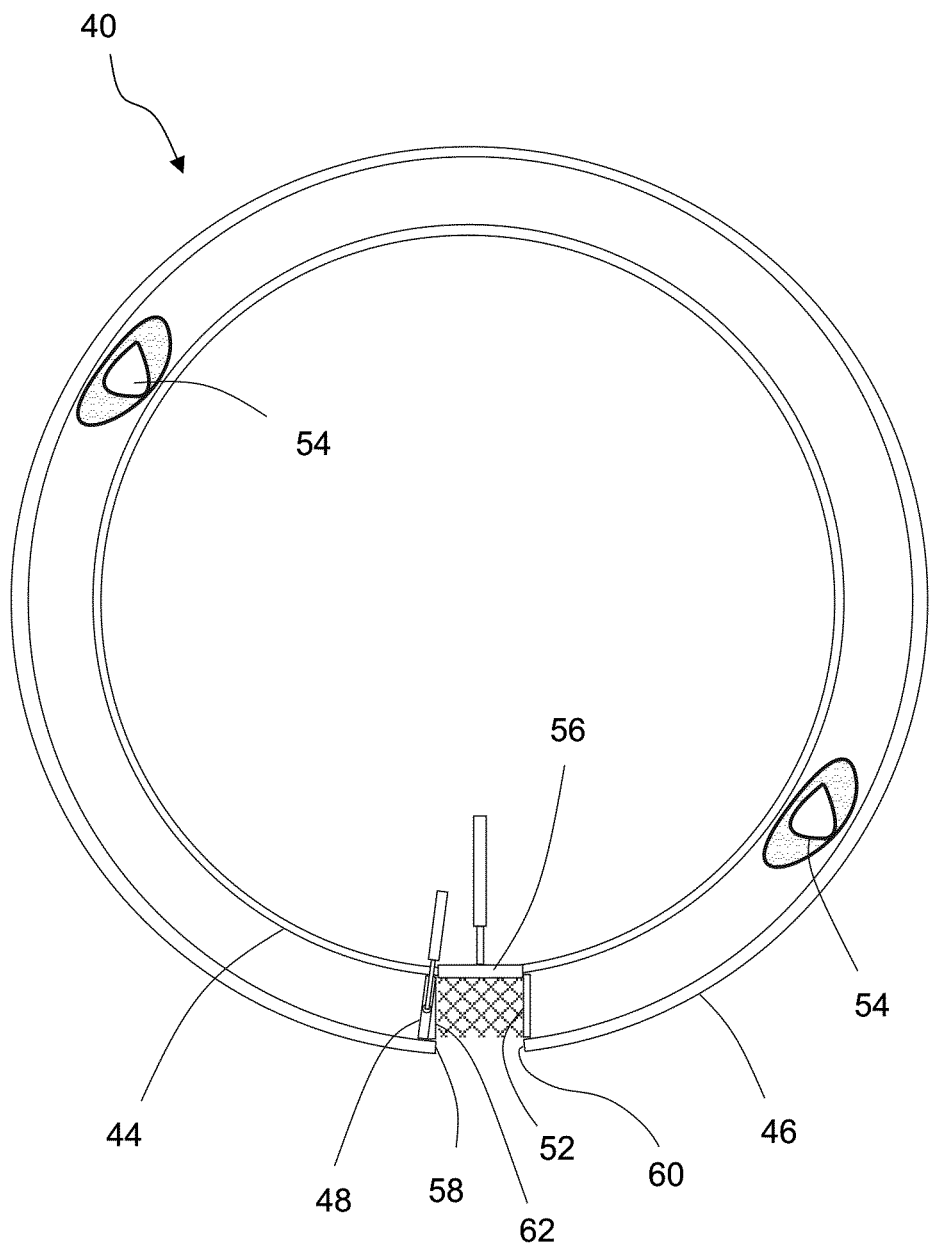
FIG. 4a shows a perspective of a collector.

FIG. 4a shows a perspective of a collector 40 for collecting solid food products 54 with sticky coatings and discharging the collected solid food products.

As mentioned in connection with FIG. 1, the collector is located below a multihead weigher, which may be such a multihead weigher described in connection with FIG. 1. The multihead weigher is not shown in FIG. 4a.

The collector is formed as an annularly shaped compartment with a first opening facing upwards for receiving the solid food products, which are discharged from receptacles located above the annularly shaped compartment.

The number of discharged solid food products depends on the weight of individual solid food products and a target weight of a package, which the number of solid food products are to be batched and packaged in, i.e. a target weight may range between 100 g and 10 kg for example. In FIG. 4a, two solid food products have been discharged into the collector.

The annularly shaped compartment has a center, which coincides with a vertical axis that also goes through a center of the multihead weigher, i.e. the centers are along a common vertical axis at different heights.

The first opening is delimited by two concentric side walls extending upwards from a bottom wall 42. The bottom wall has the shape of a circle, but it may have an annular shape (ring-shaped). The two concentric side walls are constituted by an inner wall 44 and an outer wall 46.

The radial distance between the inner wall and the outer wall (the width of the compartment) is greater than the distance between the first end wall 22 and the second end wall 24 so that the solid food products do not fall outside the collector as they are discharged from the feeding and weighing system.

The collector has a first scraper 48, which can move/rotate in an angular direction in the annularly shaped compartment.

The collector also has a partition wall 52, and a second opening in the outer wall between a third edge 58 and a fourth edge 60.

In a first embodiment of the collector, the partition wall can move in and out of the annularly shaped compartment either in a horizontal direction or in a vertical direction. When the partition wall is in the annularly shaped compartment, it is next to the fourth edge.

In a second embodiment of the collector, the partition wall is stationary. In the second embodiment, the partition wall is next to the fourth edge.

Figure 4B:
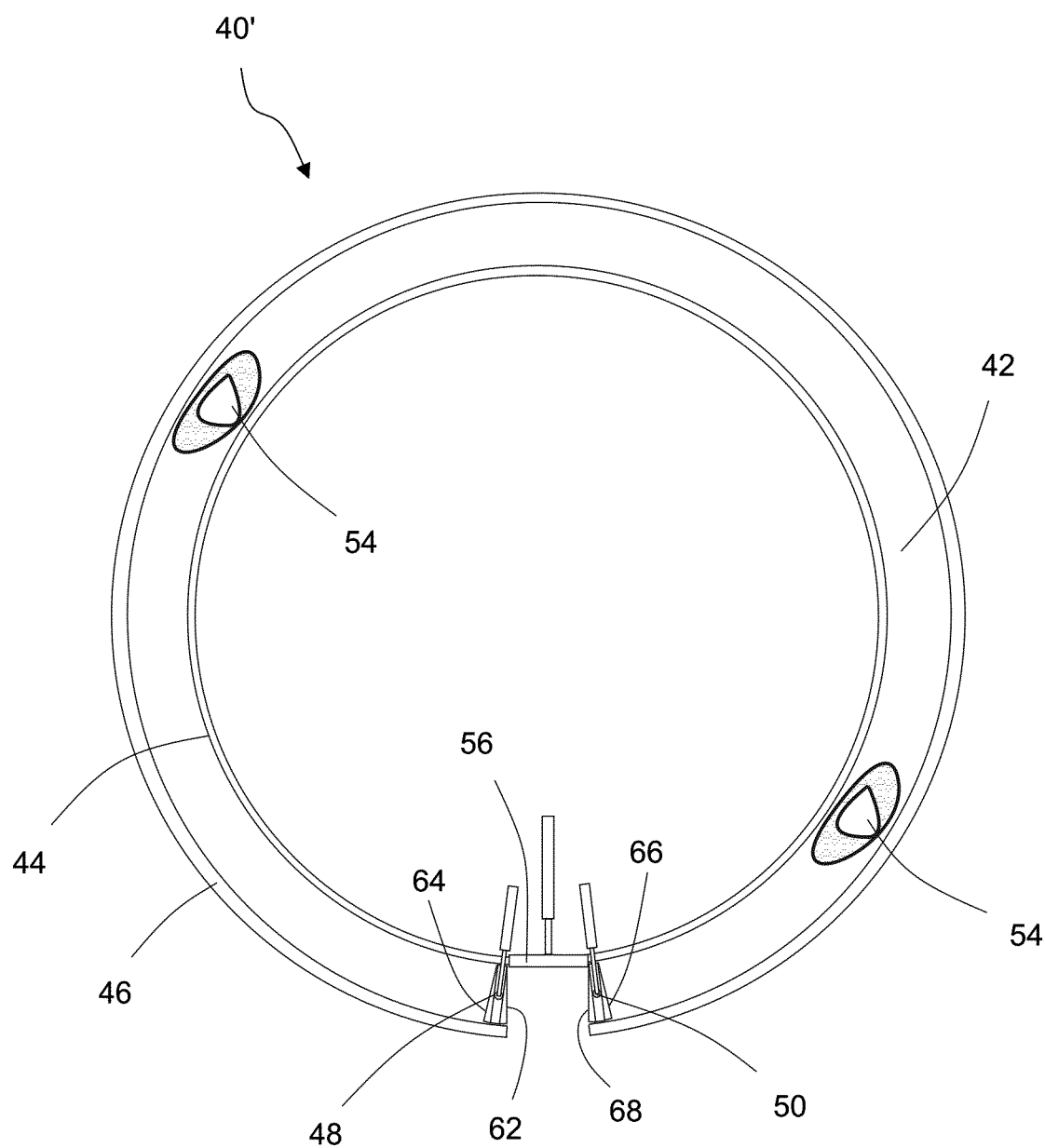
FIG. 4b shows a perspective of a collector.

In connection with FIG. 4b is described a third embodiment of a collector 40' in which the partition wall is replaced by a second scraper.

Figure 4C:
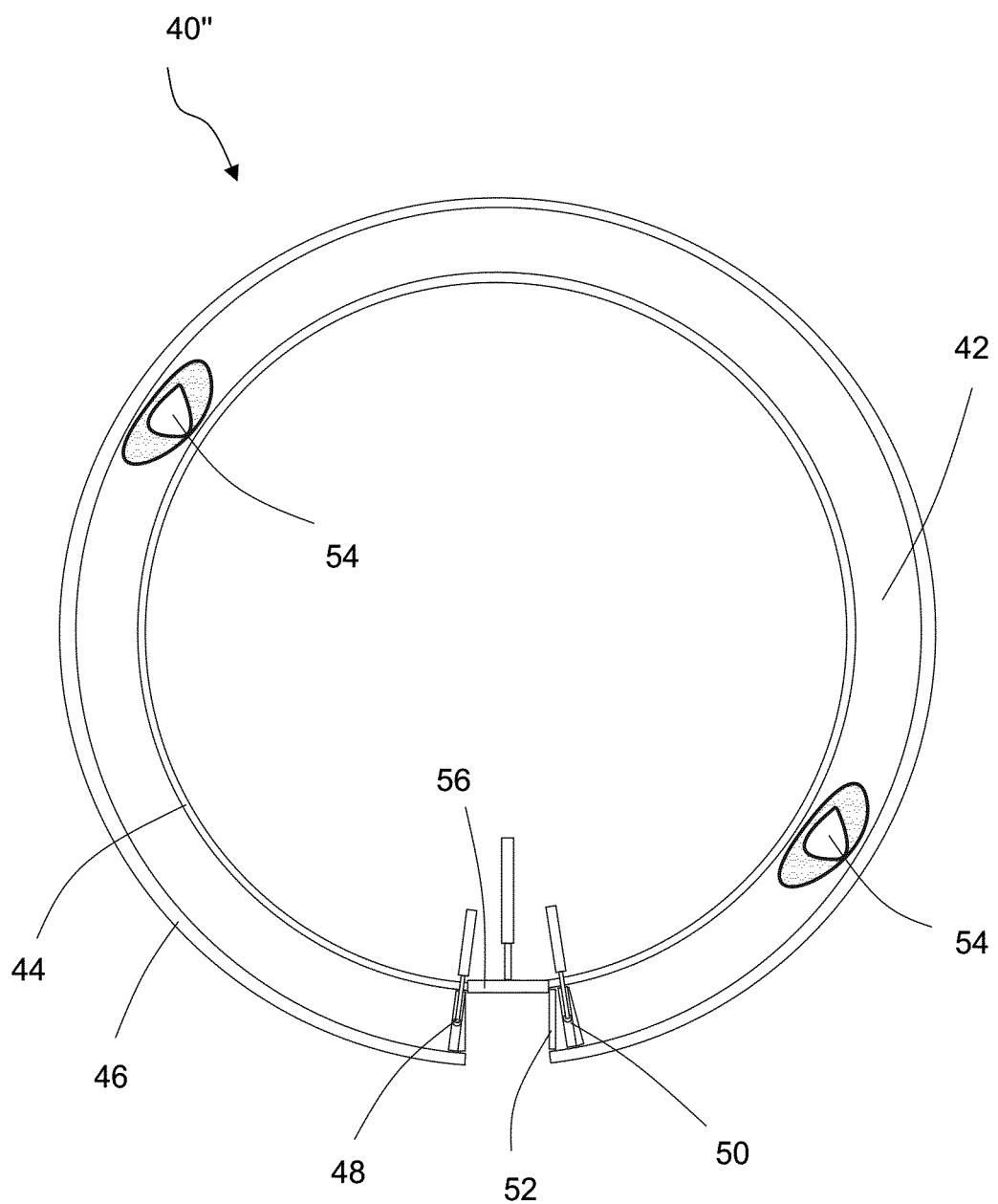
FIG. 4c shows a perspective of a collector.

In connection with FIG. 4c is described a fourth embodiment of a collector 40", which in addition to a first scraper and a partition wall also includes a second scraper.

Returning to the first embodiment, the two solid food products that have been discharged to the collector are to be collected and discharged from the collector. To do this, the partition wall moves out of the annularly shaped compartment and out of the way of the first scraper. The partition wall is connected to an actuator for moving the partition wall in and out of the annularly shaped compartment. The first scraper then moves from a position next to the third edge past the second opening and past where the partition wall was and can begin to scrape the bottom wall of the annularly shaped compartment.

The first scraper has a first face 62 facing the scraping direction θ, in which the first scraper is moved around the annularly shaped compartment.

The first scraper has a second scraping edge for scraping a bottom surface of the annularly shaped compartment. The first scraper also has a third scraping edge and a fourth scraping edge for scraping a surface of the inner wall and the outer wall, respectively.

As the first scraper scrapes the annularly shaped compartment, the partition wall comes back into the annularly shaped compartment.

On its way around the annularly shaped compartment, the first scraper collects the two solid food products and moves back to the position at the third edge. This procedure constitutes a collection mode.

As the two solid food products have been collected, the first scraper at the first edge forms a discharge compartment within the annularly shaped compartment together with the partition wall, and a piston 56, i.e. the two solid food products have been moved to an area of the surface of the bottom wall adjacent the second opening—the area being marked with a hatched pattern, i.e. the discharge compartment is to be understood as an area of the collector. The area being bounded by the first scraper, the piston, and the partition wall.

The collected solid food products are then to be discharged from the discharge compartment through the second opening. This is done by displacing the piston in a radial direction. The piston at the same time scrapes the bottom surface and side surfaces of the discharge compartment so that as little sticky coating as possible is left in the discharge compartment. This procedure constitutes a discharging mode.

The surface of the partition wall facing the discharge compartment is in a vertical plane, which is parallel with the direction of movement of the piston such that the piston can scrape the surface of the partition wall facing the discharge compartment (when the collector is in the discharging mode).

The first face faces the discharge compartment in the discharging mode and is in a plane, which is parallel with the direction of movement of the piston, i.e. to the radial direction, which the piston is moved along—meaning that the radial direction does not cross the plane. The piston scrapes the first face during discharging of collected solid food products in the discharging mode.

The first scraper has a thickness (measured in an angular direction), which increases going from the inner wall towards the outer wall.

The piston has a fifth, sixth and eight scraping edge for scraping the bottom wall, the partition wall, and the first face, respectively.

After the discharge compartment has been emptied, the collector is ready to receive a successive number of solid food products discharged from a number of receptacles (receiving mode).

The collector according to the first embodiment cycles between the receiving mode, the collection mode and the discharging mode. The collector according to the first embodiment is able to be in the receiving mode and discharging mode at the same time.

In the second embodiment (where the partition wall is permanently fixated at the third edge), the first scraper rotates back and forth.

After the discharge compartment has been emptied (and before a successive number of solid food particles have been discharged to the annularly shaped compartment), the first scraper is rotated counter wise the scraping direction away from the second edge, and over to a position adjacent to the partition wall. Solid food products are then discharged to the annularly shaped compartment, and the first scraper starts to scrape the annularly shaped compartment and collect solid food products (in a collection mode). Finally, the collector enters a discharging mode as described in connection with the first embodiment.

The collector according to the second embodiment cycles between the receiving mode, the collection mode and the discharging mode. The collector according to the second embodiment is not able to be in the receiving mode and discharging mode at the same time.

FIG. 4b shows a perspective of a collector 40' according to a third embodiment for collecting a number of solid food products, which have been emptied from a respective number of receptacles 20.

As mentioned in connection with FIG. 1, the collector is located below a multihead weigher, which may be such a multihead weigher described in connection with FIG. 1. The multihead weigher is not shown in FIG. 4b.

Compared to the collector according to the first embodiment, the collector according to the third embodiment has a second scraper instead of a partition wall. The second scraper is identical to the first scraper. Furthermore, each of the first and second scraper has a backside 64,68.

The second scraper has a ninth scraping edge for scraping a bottom surface of the annularly shaped compartment. The second scraper also has a tenth scraping edge and an eleventh scraping edge for scraping a surface of the inner wall and the outer wall, respectively.

In FIG. 4b, the collector is in a state where the first scraper is located next to the third edge with the first face facing the discharge compartment and the first backside facing an opposite direction.

The second scraper is located next to the fourth edge with the second backside facing the discharge compartment and having a second face facing the opposite direction (away from the discharge compartment).

The second backside is in a vertical plane, which is parallel with the direction of movement of the piston such that the piston can scrape the second backside (when the collector is in the discharging mode).

The first scraper and the second scraper are interchangeable, i.e. during operation of the collector according to the third embodiment, the collector alternates between scraping the annularly shaped compartment with the first scraper and the second scraper. The first scraper and the second scraper rotate exclusively in the scraping direction.

In order to collect the two solid food products that have been discharged to the collector in FIG. 4b, the second scraper rotates in the scraping direction away from the position at the fourth edge. Concurrently, the first scraper rotates in the scraping direction away from the position at the third edge, past the second opening and over to a position at the fourth edge where the second scraper was previously positioned before it started scraping the annularly shaped compartment.

The second scraper rotates all the way over to a position at the third edge. In doing so, the two solid food products will have been collected and pushed into the discharge compartment. The two scrapers have now changed places compared to a previous discharging mode, i.e. the first backside is in a vertical plane, which is parallel with the direction of movement of the piston such that the piston can scrape the first backside, and the second face facing the discharge compartment. When the second face faces the discharge compartment, the second face is in a vertical plane, which is parallel with the direction of movement of the piston such that the piston can scrape the second face.

The collector according to the third embodiment cycles between the receiving mode, the collection mode and the discharging mode. The collector according to the third embodiment is able to be in the receiving mode and discharging mode at the same time.

FIG. 4c shows a perspective of a collector 40" according to a fourth embodiment for collecting a number of solid food products, which has been emptied from a respective number of receptacles 20.

As mentioned in connection with FIG. 1, the collector is located below a multihead weigher, which may be such a multihead weigher described in connection with FIG. 1. The multihead weigher is not shown in FIG. 4c.

Compared to the collector according to the first embodiment, the collector according to the fourth embodiment additionally has a second scraper. The second scraper is identical to the first scraper.

In FIG. 4c, the collector is in a state where the first scraper is located next to the third edge with the first face facing the discharge compartment, the partition wall being in the annularly shaped compartment, and the second scraper being adjacent to the partition wall on an opposite side of the partition wall than the first scraper.

Figure 4D:
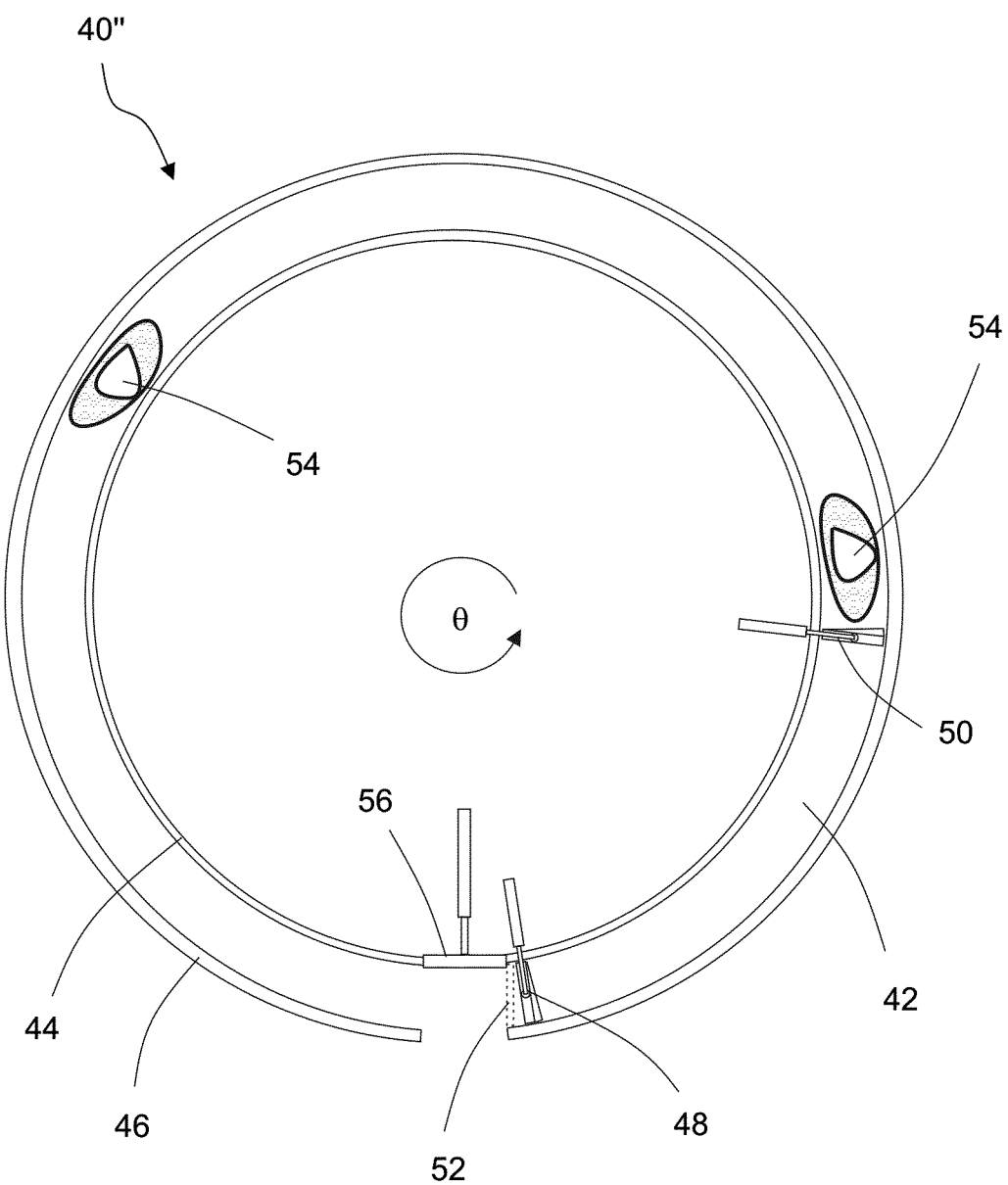
FIG. 4d shows a perspective of the collector shown in FIG. 4c in an operational mode constituting a collection mode.

The two solid food products that have been discharged to the collector are to be collected and discharged from the collector. To do this, the second scraper rotates in the scraping direction away from the position adjacent the partition wall. Concurrently, the partition wall moves out of the annularly shaped compartment and out of the way of the first scraper. The first scraper then moves from a position next to the third edge past the second opening and past where the partition wall was. This is illustrated in FIG. 4d, where an image of the partition wall is shown with a dotted circumference since it has been moved out of the annularly shaped compartment.

The partition wall is then moved back again into the annularly shaped compartment, and the first scraper is positioned adjacent the partition wall.

The second scraper rotates all the way over to a position at the third edge. In doing so, the two solid food products will have been collected and pushed into the discharge compartment. The two scrapers have now changed places compared to a previous discharging mode, i.e. with the second scraper having a second face facing the discharge compartment—the second face being in a vertical plane, which is parallel with the direction of movement of the piston such that the piston can scrape the second face.

Figure 4E:
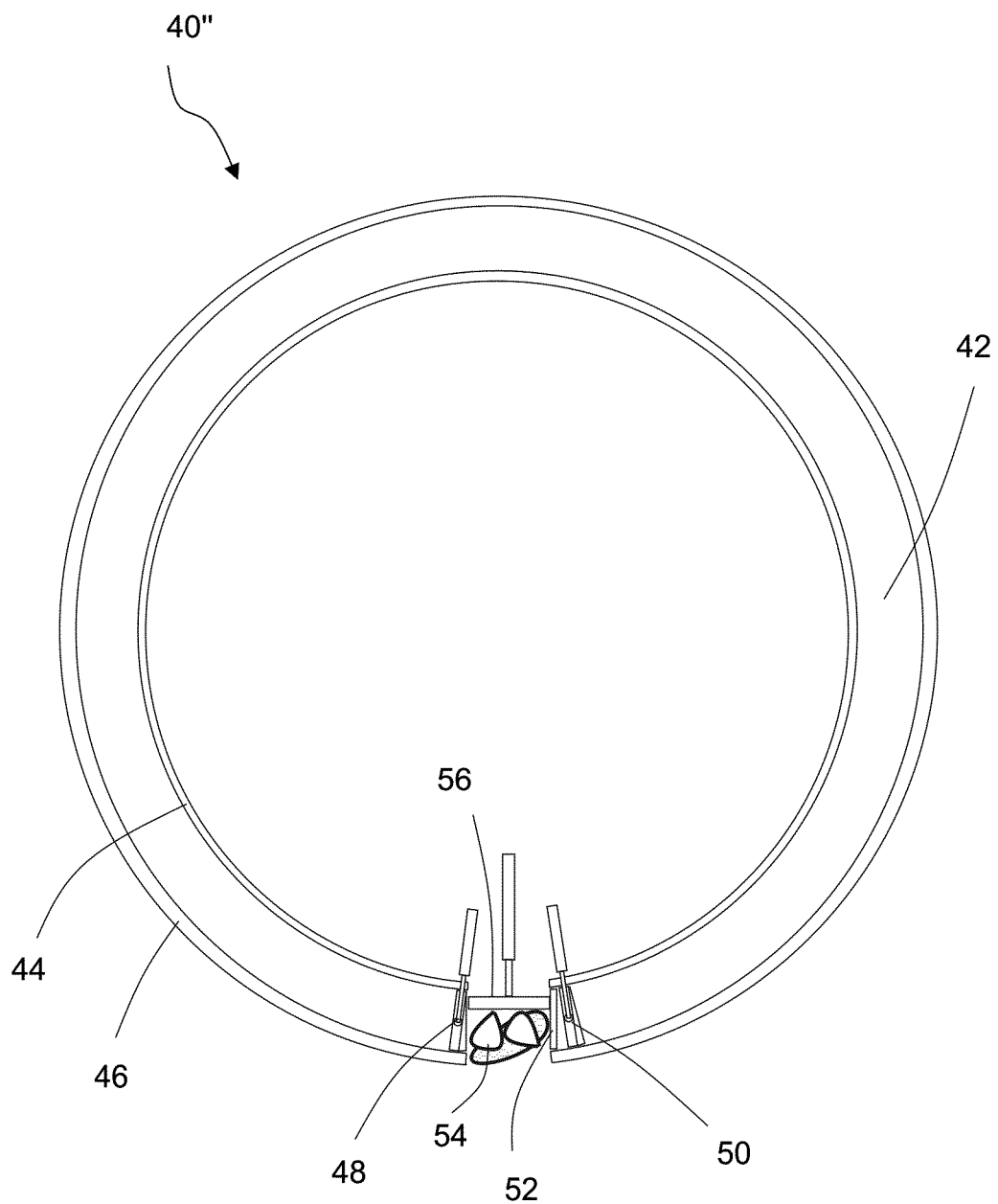
FIG. 4e shows a perspective of the collector shown in FIG. 4c in an operational mode constituting a discharging mode.

Finally, the piston can discharge the collected solid food products out of the discharge compartment through the second opening, which is illustrated in FIG. 4e.

The first scraper and the second scraper take turns scraping the annularly shaped compartment.

The following items describe further features according to the present specification.

1. A method of feeding and weighing a solid food product with a sticky coating, said method comprising:
providing a pool hopper, said pool hopper including
an inlet end for receiving said solid food product,
an outlet end for discharging said solid food product,
a feeder for conveying said solid food product from said inlet end to said outlet end, introducing said solid food product into said inlet end,
conveying by means of said feeder said food products in a direction from said inlet end towards said outlet end, providing a receptacle for weighing said solid food product, and a receptacle support for supporting said receptacle, said receptacle being located below said outlet end, said receptacle including a first end wall and a second end wall opposite said first end wall, a first axis extending through said first end wall and said second end wall, a receptacle wall between said first end wall and said second end wall, said receptacle wall having an inner surface constituting a circular cylindrical surface having its axis of rotation coinciding with said first axis, said inner surface extending angularly around said first axis from a first edge to a second edge over a first angle, said first angle being more than 150° and less than 180°, said receptacle further including an opening between said first edge and said second edge for receiving said solid food product when discharged from said outlet end, said receptacle being rotatably mounted to said receptacle support for rotating around said first axis, in a first operational mode, discharging said solid food product from said outlet end into said receptacle and weighing said solid food product, said opening facing upwards in said first operational mode, providing a scraper for scraping said inner surface, said scraper having a scraper edge contacting said inner surface, said scraper edge being proximate said first edge and stationary when said receptacle rotates around said first axis, in a second operational mode rotating said receptacle such that said second edge being rotated to said scraper edge while scraping said inner surface, and said solid food product being discharged from said receptacle.

2. A method according to item 1, comprising stopping said receptacle rotation when said second edge is at said scraping edge.

3. A method according to any of the preceding items, said receptacle having a shape of a hollow semi cylinder.

4. A method according to any of the preceding items, said bottom wall having a shape of a folded rectangle.

5. A method according to any of the preceding items, said scraper having a U-shape for scraping said aid inner surface, said first end wall, and said second end wall.

6. A weigher head for feeding and weighing a solid food product with a sticky coating, said weigher head comprising:
a pool hopper, said pool hopper including
an inlet end for receiving said solid food product,
an outlet end for discharging said solid food product,
a feeder for conveying said solid food product from said inlet end to said outlet end,
said weigher head comprising
a receptacle for weighing said solid food product, and a receptacle support for supporting said receptacle, said receptacle being located below said outlet end,
said receptacle including
a first end wall, and a second end wall opposite said first end wall,
a first axis extending through said first end wall and said second end wall,
a bottom wall between said first end wall and said second end wall,
said bottom wall having an inner surface constituting a circular cylindrical surface having its axis of rotation coinciding with said first axis, said inner surface extending angularly around said first axis from a first edge to a second edge over a first angle, said first angle being more than 150° and less than 180°, said receptacle further including an opening between said first edge and said second edge for receiving said solid food product when discharged from said outlet end, said receptacle being rotatable mounted to said receptacle support for rotating around said first axis, said receptacle further including a scraper for scraping said inner surface, said scraper having a scraper edge contacting said inner surface, said scraper edge being proximate said first edge and stationary when said receptacle rotates around said first axis, said weigher head further comprising an actuator for rotating said receptacle in an angular direction such that said second edge being rotated to said scraper edge, and said solid food product being discharged from said receptacle.

7. A multihead weigher for use in packaging solid food products with sticky coatings, said multihead weigher comprising:
a receiving section for receiving solid food products,
a first weigher head according to item 6, and
a second weigher head according to item 6,
said first weigher head and said second weigher head being located angularly apart such that there is a rotational symmetry in a horizontal plane between said first weigher head and said second weigher head.

8. A method of collecting solid food products with sticky coatings received from a multihead weigher, and discharging said collected solid food products, said method comprising:
providing an annularly shaped compartment with a first opening facing upwards for receiving said solid food products,
said first opening delimited by two concentric side walls extending upwards from a bottom wall,
further providing
a first scraper positioned in said annularly shaped compartment and movable in an angular direction within said annularly shaped compartment,
a discharge compartment within said annularly shaped compartment,
a piston positioned in said discharge compartment and movable in a radial direction within said discharge compartment,
said discharge compartment having a discharge opening,
said method further comprising
  in a first operational mode, receiving said solid food products in said annularly shaped compartment from said multihead weigher,
  in a second operational mode scraping said annularly shaped compartment by means of said first scraper in said angular direction thereby collecting said received solid food products into a first batch, and
introducing said first batch into said discharge compartment,
  in a third operational mode scraping said discharge compartment by means of said piston in said radial direction and discharging said first batch through said discharge opening.

9. A method according to item 8, comprising cycling between said first operational mode, said second operational mode and said third operational mode for collection of a successive number of solid food products with sticky coatings into successive batches and discharging said successive batches one at a time.

10. A method according to any of items 8 to 9, said partition wall having a first side facing said discharge compartment, said first side having a surface in a vertical plane being parallel with said radial direction.

11. A method according to any of items 8 to 10, comprising providing a second scraper for scraping said annularly shaped compartment in said angular direction, alternately scraping said annularly shaped compartment by means of said first scraper and said second scraper, respectively, for collecting said discharged solid food products into a batch, and introducing said batch into a discharge compartment.

12. A method according to item 11, said second scraper having a second face facing said discharge compartment in said third operational mode when said second scraper having scraped said annularly shaped compartment in said second operational mode.

13. A method according to any of items 11 to 12, comprising cycling between said first operational mode, said second operational mode, and said third operational mode for collection of successive solid food products with sticky coatings into successive batches and discharging said successive batches.

14. A method according to any of items 8 to 13, comprising moving said partition wall to a position outside said annularly shaped compartment in said first or second operational mode such that said partition wall is out of a path of either said first scraper or said second scraper.

15. A collector for collecting solid food products with sticky coatings received from a multihead weigher, and discharging said collected solid food products, said collector comprising:
an annularly shaped compartment with a first opening facing upwards for receiving said solid food products,
said first opening delimited by two concentric side walls extending upwards from a bottom wall,
said collector further comprising
a first scraper positioned in said annularly shaped compartment and movable in an angular direction within said annularly shaped compartment for scraping said annularly shaped compartment and collecting said received solid food products into a first batch, and introducing said first batch into said discharge compartment,
a discharge compartment within said annularly shaped compartment having a discharge opening,
a piston positioned in said discharge compartment and movable in a radial direction within said discharge compartment for scraping said discharge compartment and discharging said first batch through said discharge opening.

16. A method of collecting solid food products with sticky coatings received from a multihead weigher, and discharging said collected solid food products, said method comprising:
providing an annularly shaped compartment with a first opening facing upwards for receiving said solid food products,
said first opening delimited by two concentric side walls extending upwards from a bottom wall,
further providing
a first scraper positioned in said annularly shaped compartment and movable in an angular direction within said annularly shaped compartment,
a discharge compartment within said annularly shaped compartment,
a partition wall positioned in said annularly shaped compartment and separating said annularly shaped compartment and said discharge compartment,
a piston positioned in said discharge compartment and movable in a radial direction within said discharge compartment,
said discharge compartment having a discharge opening,
said method further comprising
moving said first scraper to a position adjacent to said partition wall such that said first scraper being on an opposite side of said partition wall with respect to said discharge compartment, receiving said solid food products in said annularly shaped compartment from said multihead weigher,
scraping said annularly shaped compartment by means of said first scraper in said angular direction,
collecting said received solid food products into a first batch,
introducing said first batch into said discharge compartment,
scraping said discharge compartment by means of said piston in said radial direction, and
discharging said first batch through said discharge opening.

17. A method of collecting solid food products with sticky coatings received from a multihead weigher, and discharging said collected solid food products, said method comprising:
providing an annularly shaped compartment with a first opening facing upwards for receiving said solid food products,
said first opening delimited by two concentric side walls extending upwards from a bottom wall,
further providing
a first scraper positioned in said annularly shaped compartment and movable in an angular direction within said annularly shaped compartment,
a discharge compartment within said annularly shaped compartment,
a partition wall movable between a first position outside said annularly shaped compartment and a second position in said annularly shaped compartment for separating said annularly shaped compartment and said discharge compartment,
a piston positioned in said discharge compartment and movable in a radial direction within said discharge compartment,
said discharge compartment having a discharge opening,
said method further comprising
receiving said solid food products in said annularly shaped compartment from said multihead weigher,
moving said partition wall to said first position,
scraping said annularly shaped compartment by means of said first scraper in said angular direction,
moving said partition wall to said second position,
collecting said received solid food products into a first batch,
introducing said first batch into said discharge compartment,
scraping said discharge compartment by means of said piston in said radial direction, and
discharging said first batch through said discharge opening.

18. A method of collecting solid food products with sticky coatings received from a multihead weigher, and discharging said collected solid food products, said method comprising:
providing an annularly shaped compartment with a first opening facing upwards for receiving said solid food products,
said first opening delimited by two concentric side walls extending upwards from a bottom wall,
further providing
a first scraper positioned in said annularly shaped compartment and movable in an angular direction within said annularly shaped compartment, a second scraper positioned in said annularly shaped compartment and movable in said angular direction within said annularly shaped compartment,
a discharge compartment within said annularly shaped compartment,
a piston positioned in said discharge compartment and movable in a radial direction within said discharge compartment,
said discharge compartment having a discharge opening,
said method further comprising
receiving said solid food products in said annularly shaped compartment from said multihead weigher,
in a first operational mode, scraping said annularly shaped compartment by means of said first scraper in said angular direction, thereby collecting said received solid food products into a first batch, and introducing said first batch into said discharge compartment while moving said second scraper across said discharge compartment, or
in a second operational mode, scraping said annularly shaped compartment by means of said second scraper in said angular direction, thereby collecting said received solid food products into a first batch, and introducing said first batch into said discharge compartment while moving said first scraper across said discharge compartment,
scraping said discharge compartment by means of said piston in said radial direction, and discharging said first batch through said discharge opening, and
alternating between said first operational mode and said second operational mode for collecting successive solid food products received in said annularly shaped compartment.

19. A method of collecting solid food products with sticky coatings received from a multihead weigher, and discharging said collected solid food products, said method comprising:
providing an annularly shaped compartment with a first opening facing upwards for receiving said solid food products,
said first opening delimited by two concentric side walls extending upwards from a bottom wall,
further providing
a first scraper positioned in said annularly shaped compartment and movable in an angular direction within said annularly shaped compartment,
a second scraper positioned in said annularly shaped compartment and movable in said angular direction within said annularly shaped compartment,
a discharge compartment within said annularly shaped compartment,
a partition wall movable between a first position outside said annularly shaped compartment and a second position in said annularly shaped compartment for separating said annularly shaped compartment and said discharge compartment,
a piston positioned in said discharge compartment and movable in a radial direction within said discharge compartment,
said discharge compartment having a discharge opening,
said method further comprising
receiving said solid food products in said annularly shaped compartment from said multihead weigher,
moving said partition wall to said position outside said annularly shaped compartment,
in a first operational mode, scraping said annularly shaped compartment by means of said first scraper in said angular direction, thereby collecting said received solid food products into a first batch, and introducing said first batch into said discharge compartment while moving said second scraper across said discharge compartment, and moving said partition wall to said second position,
or
in a second operational mode, scraping said annularly shaped compartment by means of said second scraper in said angular direction, thereby collecting said received solid food products into a first batch, and introducing said first batch into said discharge compartment while moving said first scraper across said discharge compartment, and moving said partition wall to said second position,
scraping said discharge compartment by means of said piston in said radial direction, and discharging said first batch through said discharge opening, and
alternating between said first operational mode and said second operational mode for collecting successive solid food products received in said annularly shaped compartment.

20. A method of feeding, weighing and collecting solid food product with a sticky coating, said method comprising:
providing a pool hopper, said pool hopper including
an inlet end for receiving said solid food product,
an outlet end for discharging said solid food product,
a feeder for conveying said solid food product from said inlet end to said outlet end,
introducing said solid food product into said inlet end,
conveying by means of said feeder said food products in a direction from said inlet end towards said outlet end,
providing a receptacle for weighing said solid food product, and a receptacle support for supporting said receptacle, said receptacle being located below said outlet end, said receptacle including
a first end wall and a second end wall opposite said first end wall,
a first axis extending through said first end wall and said second end wall,
a receptacle wall between said first end wall and said second end wall,
said receptacle wall having an inner surface constituting a circular cylindrical surface having its axis of rotation coinciding with said first axis,
said inner surface extending angularly around said first axis from a first edge to a second edge over a first angle, said first angle being more than 150° and less than 180°,
said receptacle further including an opening between said first edge and said second edge for receiving said solid food product when discharged from said outlet end,
said receptacle being rotatably mounted to said receptacle support for rotating around said first axis,
discharging said solid food product from said outlet end into said receptacle and weighing said solid food product, said opening facing upwards in said first operational mode,
providing a scraper for scraping said inner surface,
said scraper having a scraper edge contacting said inner surface,
said scraper edge being proximate said first edge and stationary when said receptacle rotates around said first axis,
rotating said receptacle such that said second edge being rotated to said scraper edge while scraping said inner surface, and said solid food product being discharged from said receptacle,
providing an annularly shaped compartment with a first opening facing upwards for receiving said solid food product,
said first opening delimited by two concentric side walls extending upwards from a bottom wall,
receiving said solid food product in said annularly shaped compartment, further providing
a first scraper positioned in said annularly shaped compartment and movable in an angular direction within said annularly shaped compartment,
a discharge compartment within said annularly shaped compartment,
a piston positioned in said discharge compartment and movable in a radial direction within said discharge compartment,
said discharge compartment having a discharge opening,
scraping said annularly shaped compartment by means of said first scraper in said angular direction, thereby collecting said received solid food product into a first batch, and introducing said first batch into said discharge compartment,
scraping said discharge compartment by means of said piston in said radial direction and discharging said first batch through said discharge opening.

In the following is given a list of reference signs that are used in the description and the drawings referred to in the description.
10 Multihead weigher
12 Receiving section
14 Inlet end
16 Feeder
18 Outlet end
20 Receptacle
22 First end wall
24 Second end wall
26 Receptacle wall
28 Receptacle scraper
32 First edge
34 Second edge
36 First axis
φ First angle
40 Collector
42 Bottom wall
44 Inner wall
46 Outer wall
48 First scraper
50 Second scraper
52 Partition wall
54 Solid food product
56 Piston
58 Third edge
60 Fourth edge
62 First face
64 First backside
66 Second face
68 Second backside
θ Scraping direction

The invention claimed is:

1. A method of collecting solid food products with sticky coatings received from a multihead weigher, and discharging the collected solid food products, the method comprising:
    (a) providing an annularly shaped compartment with a first opening facing upwards for receiving the solid food products, the first opening delimited by two concentric side walls extending upwards from a bottom wall,
    (b) providing a first scraper positioned in the annularly shaped compartment and movable in an angular direction within the annularly shaped compartment, wherein a discharge compartment is defined within the annularly shaped compartment, the discharge compartment having a discharge opening;
    (c) providing a piston positioned in the discharge compartment and movable in a radial direction within the discharge compartment;
    (d) in a first operational mode, receiving the solid food products in the annularly shaped compartment from the multihead weigher,
    (e) in a second operational mode, scraping the annularly shaped compartment by moving the first scraper in the angular direction, thereby collecting the received solid food products into a first batch, and introducing the first batch into the discharge compartment; and
    (f) in a third operational mode, scraping the discharge compartment by moving the piston in the radial direction and discharging the first batch through the discharge opening.

2. The method of claim 1, further comprising (g) cycling among the first operational mode, the second operational mode, and the third operational mode for collection of a successive number of solid food products with sticky coatings into successive batches and discharging the successive batches one at a time.

3. The method of claim 1, wherein the annularly shaped compartment includes a partition wall having a first side facing the discharge compartment, the first side having a surface in a vertical plane parallel with the radial direction.

4. The method of claim 3, further comprising:
    (g) providing a second scraper for scraping the annularly shaped compartment in the angular direction; and
    (h) alternately scraping the annularly shaped compartment by means of the first scraper and the second scraper, respectively, for collecting the discharged solid food products into a batch, and introducing the batch into the discharge compartment.

5. The method of claim 4, wherein the second scraper has a second face facing the discharge compartment in the third operational mode when the second scraper has scraped the annularly shaped compartment in the second operational mode.

6. The method of claim 4, further comprising (i) cycling among the first operational mode, the second operational mode, and the third operational mode for collection of successive solid food products with sticky coatings into successive batches, and discharging the successive batches.

7. The method of claim 4, further comprising (i) moving the partition wall to a position outside the annularly shaped compartment in one of the first operational mode and the second operational mode, such that the partition wall is out of a path of one of the first scraper and the second scraper.

8. A collector for collecting solid food products with sticky coatings received from a multihead weigher, and discharging the collected solid food products, the collector comprising:
    an annularly shaped compartment with a first opening facing upwards so as to receive the solid food products, the first opening delimited by two concentric side walls extending upwards from a bottom wall;
    a discharge compartment within the annularly shaped compartment and having a discharge opening;
    a first scraper positioned in the annularly shaped compartment and movable in an angular direction within the annularly shaped compartment so as to scrape the annularly shaped compartment, collect the received solid food products into a first batch, and introduce the first batch into the discharge compartment; and
    a piston positioned in the discharge compartment and movable in a radial direction within the discharge compartment so as to scrape the discharge compartment and discharge the first batch through the discharge opening.

\* \* \* \* \*